US010116815B1

(12) United States Patent
Nishikawa

(10) Patent No.: US 10,116,815 B1
(45) Date of Patent: Oct. 30, 2018

(54) DISPLAY APPARATUS THAT ENSURES REDUCED OPERATION LOAD OF USER, AND IMAGE FORMING APPARATUS

(71) Applicant: KYOCERA Document Solutions Inc., Osaka (JP)

(72) Inventor: Yoshiteru Nishikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/923,400

(22) Filed: Mar. 16, 2018

(30) Foreign Application Priority Data

Apr. 26, 2017 (JP) .................................. 2017-086818

(51) Int. Cl.
*G06F 15/00* (2006.01)
*H04N 1/00* (2006.01)
*G06F 3/0488* (2013.01)

(52) U.S. Cl.
CPC ..... *H04N 1/00469* (2013.01); *G06F 3/04886* (2013.01); *H04N 1/00411* (2013.01); *G06F 2203/04808* (2013.01)

(58) Field of Classification Search
CPC ............ H04N 1/00469; H04N 1/00411; G06F 2203/04808; G06F 3/04886
USPC ....................................................... 358/1.18
See application file for complete search history.

(56) References Cited

U.S. PATENT DOCUMENTS

2012/0154448 A1  6/2012  Tomita et al. ................. 345/684
2014/0368871 A1* 12/2014  Kurumasa .......... H04N 1/00973
                                                          358/1.15

FOREIGN PATENT DOCUMENTS

JP     2012-128735 A    7/2012

* cited by examiner

*Primary Examiner* — Saeid Ebrahimi Dehkordy
(74) *Attorney, Agent, or Firm* — Stein IP, LLC

(57) ABSTRACT

A display apparatus includes a display, a first display controller, a detection unit, a determining unit, and a second display controller. The first display controller performs a control such that a first button image and a first character image are displayed on the display. The first button image transfers to a setting input screen. The first character image indicates a content of the first button image. The second display controller performs a control such that a second button image and a second character image are displayed on the display. The second button image is located on an inner side of the enlarged first region, has a second region enclosed by a second line, and detects a touch within the second region to accept the input of the predetermined setting on the setting input screen. The second character image indicates a content of the predetermined setting in the first region.

5 Claims, 5 Drawing Sheets

DISPLAY APPARATUS THAT ENSURES REDUCED OPERATION LOAD OF USER, AND IMAGE FORMING APPARATUS

INCORPORATION BY REFERENCE

This application is based upon, and claims the benefit of priority from, corresponding Japanese Patent Application No. 2017-086818 filed in the Japan Patent Office on Apr. 26, 2017, the entire contents of which are incorporated herein by reference.

BACKGROUND

Unless otherwise indicated herein, the description in this section is not prior art to the claims in this application and is not admitted to be prior art by inclusion in this section.

A typical display apparatus includes a display screen that displays a button image and a character image. The button image transfers to a setting input screen that causes a user to input a predetermined setting. The character image indicates a simple content of the predetermined setting.

A typical image forming apparatus includes a display controller, an input controller, and a notification unit. The display controller displays some buttons within a display target range as display target buttons on a display among a plurality of buttons corresponding to a respective plurality of functions and virtually arranged in a predetermined direction. The input controller accepts a scroll instruction input that changes the display target button by virtually moving in a predetermined direction in the display target range. The notification unit controls a notification operation to notify an existence of an instruction input unit to the user.

SUMMARY

A display apparatus according to one aspect of the disclosure includes a display, a first display controller, a detection unit, a determining unit, and a second display controller. The display has a touch panel function. The first display controller performs a control such that a first button image and a first character image are displayed on the display. The first button image has a first region enclosed by a first line. The first button image detects a touch within the first region to be transferred to a setting input screen for receiving a predetermined setting. The first character image is arranged in the first region. The first character image indicates a content of the first button image. The detection unit detects a request for an enlargement of a display of the first button image by an operation on the display. The determining unit determines whether an enlargement ratio is equal to or more than a predetermined value when the request for the enlargement of the display of the first button image is detected by the detection unit. The second display controller performs a control such that a second button image and a second character image are displayed on the display when the determining unit determines that the enlargement ratio is equal to or more than a predetermined value. The second button image is located on an inner side of the first region enlarged with the enlargement ratio. The second button image has a second region enclosed by a second line. The second button image detects a touch within the second region to accept the input of the predetermined setting on the setting input screen. The second character image indicates a content of the predetermined setting in the first region.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
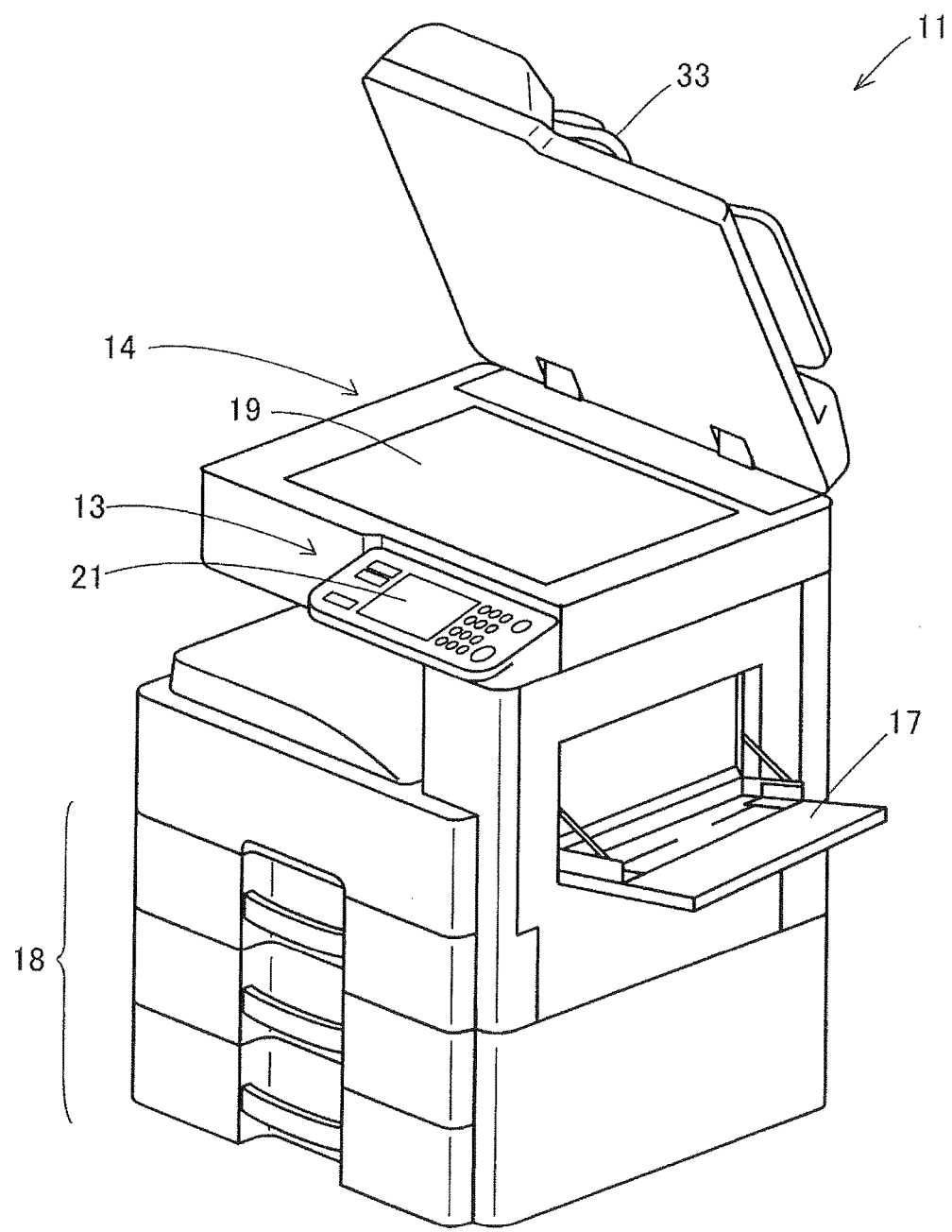
FIG. 1 schematically illustrates an external appearance of a multi-functional peripheral when an image forming apparatus according to one embodiment of the disclosure is applied to the multi-functional peripheral.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
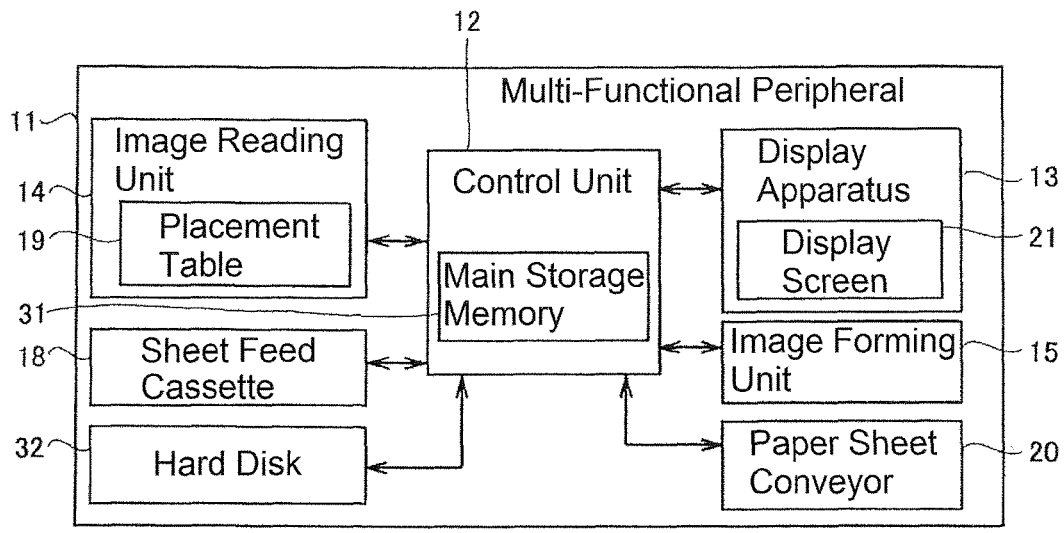
FIG. 2 illustrates a block diagram of a configuration of the multi-functional peripheral according to the embodiment.

The following describes the embodiment of the disclosure. FIG. 1 schematically illustrates an external appearance of a multi-functional peripheral 11 when an image forming apparatus according to one embodiment of the disclosure is applied to a multi-functional peripheral. FIG. 2 illustrates a block diagram of a configuration of the multi-functional peripheral 11 illustrated in FIG. 1.

In FIGS. 1 and 2, the multi-functional peripheral 11 includes a control unit 12, a display apparatus 13, an image reading unit 14, an image forming unit 15, a sheet feed cassette 18, a paper sheet conveyor 20, and a hard disk 32.

The control unit 12 controls the entire multi-functional peripheral 11. The control unit 12 is constituted of, for example, a CPU, and includes a main storage memory 31 as a storage unit temporarily storing data. The display apparatus 13 includes a display screen 21 as a display. The display screen 21 displays information. The display screen 21 has a liquid-crystal touch panel function, and is configured to cause a user to input an image formation condition and similar instruction and also, for example, to select a function via the display screen 21 by a pressing with a finger and similar operation. The image reading unit 14 reads an original document placed on a placement table 19 to obtain an image of the original document. The image reading unit 14 includes an Auto Document Feeder (ADF) 33 as a document feeder that feeds the original document set on a set position to a reading position.

The paper sheet conveyor 20 includes a plurality of conveyance rollers and conveys the paper sheet set in a manual bypass tray 17 and the sheet feed cassette 18 to the image forming unit 15. The image forming unit 15 forms an image on the paper sheet conveyed from the manual bypass tray 17 and the sheet feed cassette 18 based on the image of the original document obtained by the image reading unit 14. The hard disk 32 as a storage unit stores data on image formation, for example, transmitted image data and an input image formation condition.

Figure 3:
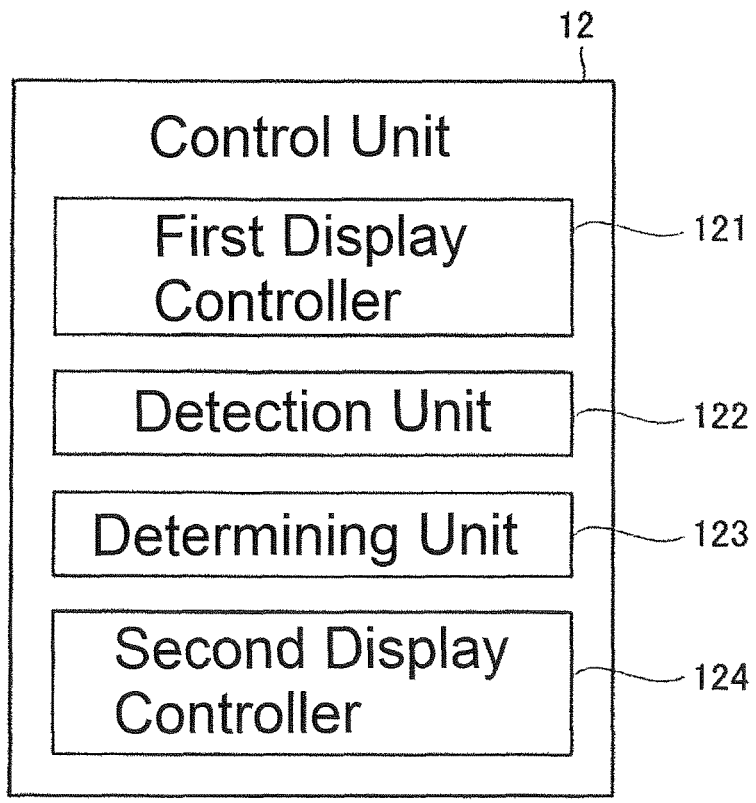
FIG. 3 illustrates a block diagram of a configuration of a control unit according to the embodiment.

Next, a description will be given of a configuration of the control unit 12 included in the multi-functional peripheral 11. FIG. 3 illustrates a block diagram of a configuration of the control unit 12. With reference to FIG. 3, the control unit 12 includes a first display controller 121, a detection unit 122, a determining unit 123, and a second display controller 124.

The first display controller 121 performs a control such that a first button image and a first character image are displayed on the display screen 21. The first button image has a first region enclosed by a first line and detects a touch within the first region to be transferred to a setting input screen that causes a user to input a predetermined setting. The first character image is arranged in the first region, and indicates a content of the first button image. The detection unit 122 detects a request for an enlargement of the display of the first button image by an operation on the display screen 21. The determining unit 123 determines whether or not an enlargement ratio is equal to or more than a predetermined value when the request for the enlargement of the display of the first button image is detected by the detection unit 122. The enlargement ratio means a proportion of a size of the first button image after the enlargement to a size of the first button image before the enlargement. The size of the first button image before the enlargement is appropriately configured. The predetermined value is 120% for example. When the determining unit 123 determines that the enlargement ratio is equal to or more than the predetermined value, the second display controller 124 performs a control such that a second button image and a second character image are displayed on the display screen 21. The second button image is located on an inner side of the first region enlarged with the enlargement ratio, is a second region enclosed by a second line, and detects a touch within the second region to accept an input of the predetermined setting on the setting input screen. The second character image indicates a content of the predetermined setting in the first region. These configurations will be described later in detail.

Figure 4:
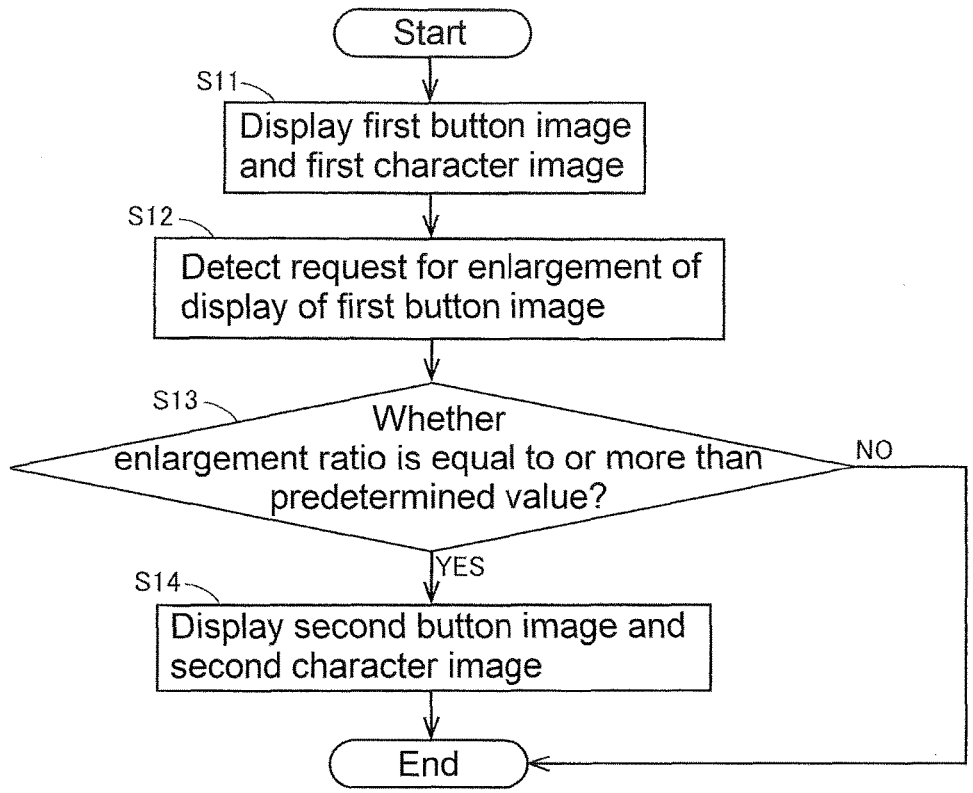
FIG. 4 illustrates a flow of a process when a second button image and a second character image are displayed.

Next, a description will be given of a case where the second button image and the second character image are displayed when the display of the first button image is enlarged to cause the enlargement ratio to exceed the predetermined value. FIG. 4 illustrates a flow of a process when the second button image and the second character image are displayed when the display of the first button image is enlarged to cause the enlargement ratio to exceed the predetermined value.

With reference to FIG. 4, first, the first display controller 121 controls the display screen 21 to display the first button image and the first character image (Step S11 in FIG. 4, hereinafter "Step" will be omitted).

Figure 5:
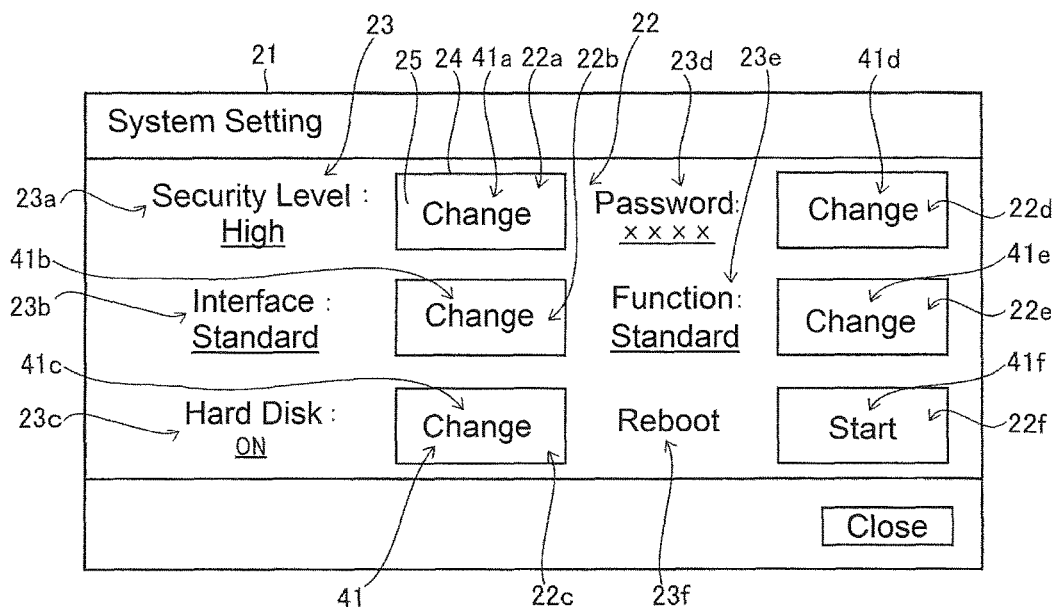
FIG. 5 schematically illustrates a display screen according to the embodiment where a first button image and a first character image are displayed.

FIG. 5 schematically illustrates the display screen 21 where the first button image and the first character image are displayed. With reference to FIG. 5, a first button image 22 is constituted of a rectangular-shaped first region 25 enclosed by a first line 24. The first button image 22 includes a first character image 41 that indicates a content of the first button image 22 in the first region 25. The first button image 22 includes button images 22a, 22b, 22c, 22d, 22e, and 22f. The button image 22a includes a character image 41a. The button image 22b includes a character image 41b. The button image 22c includes a character image 41c. The button image 22d includes a character image 41d. The button image 22e includes a character image 41e. The button image 22f includes a character image 41f. The first button image 22 is configured to detect the touch by the user on the first region 25. The first button image 22 is configured to detect the touch by the user on the first region 25 to be transferred to the setting input screen that causes the user to input the predetermined setting. The first button image 22 is transferred to the setting input screen of each of the button images 22a to 22f. A first content display image 23 is arranged on a peripheral area of the first button image 22. The first content display image 23 indicates the content of the predetermined setting. In FIG. 5, the first content display image 23 is arranged on a region on a left side of the first button image 22. The first content display image 23 includes character images 23a, 23b, 23c, 23d, 23e, and 23f.

The content of the predetermined setting includes, for example, a security level setting, an interface setting, a hard disk setting, a password setting, a function setting, a reboot setting, and similar setting in a system setting. The first button image 22 includes the button image 22a that accepts the change of the setting of the character image 23a "Security Level," the button image 22b that accepts the change of the setting of the character image 23b "Interface," the button image 22c that accepts the change of the setting of the character image 23c "Hard Disk," the button image 22d that accepts the change of the setting of the character image 23d "Password," the button image 22e that accepts the change of the setting of the character image 23e "Function," and the button image 22f that accepts the change of the setting of the character image 23f "Reboot."

Figure 6:
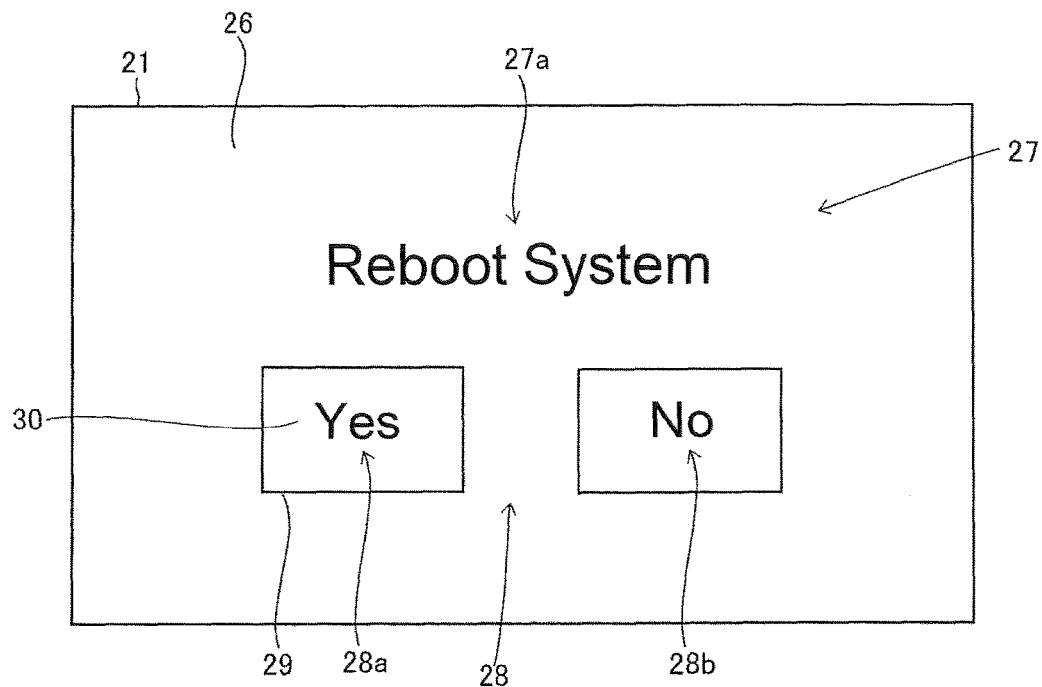
FIG. 6 schematically illustrates a setting input screen for a reboot.

FIG. 6 schematically illustrates the setting input screen for the reboot. For example, when the user touches inside the first region 25 of the button image 22f that indicates the content of the character image 23f "Reboot," a setting input screen 26 illustrated in FIG. 6 is displayed on the next screen. The setting input screen 26 includes a second character image 27 that indicates the content of the predetermined setting, and a second button image 28 that accepts the input of the predetermined setting. The content of the predetermined setting indicated by the second character image 27 is a detailed content compared with the content of the predetermined setting indicated by the first content display image 23. With reference to FIG. 6, the second character image 27 includes a character image 27a indicating "Reboot System." The second button image 28 includes a button image 28a that accepts the input of "Yes," and a button image 28b that accepts the input of "No." The button images 28a and 28b are each constituted of a rectangular-shaped second region 30 enclosed by a second line 29. The button images 28a and 28b detect the touch on the second region 30 by the user to accept the input of "Reboot."

Figure 7:
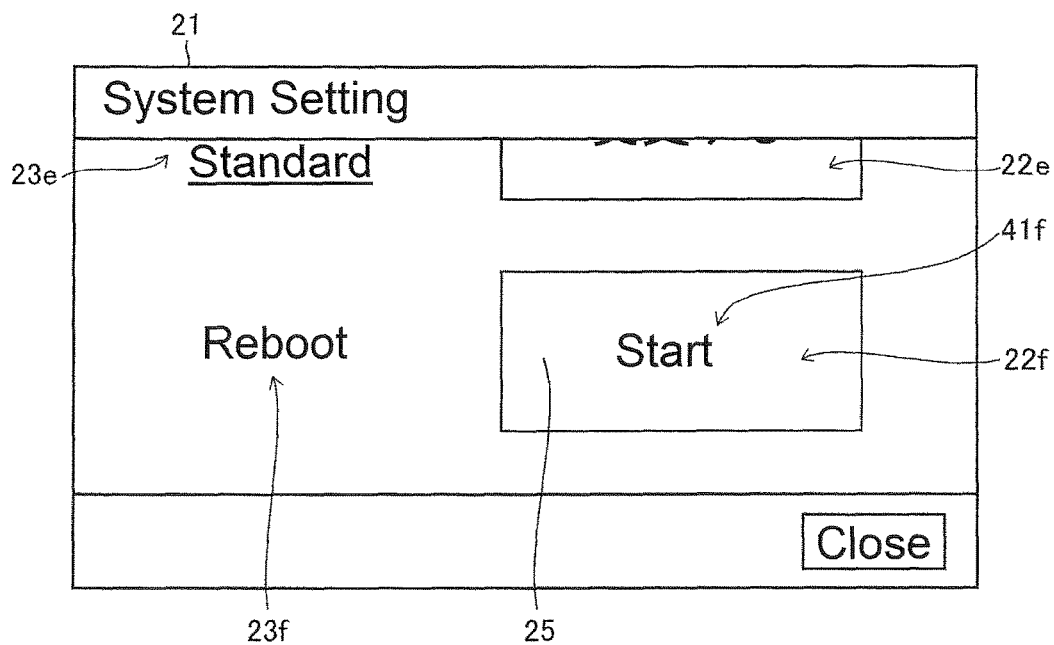
FIG. 7 schematically illustrates an enlarged display of the first button image.

Next, the detection unit 122 detects the request for an enlargement of the display of the first button image 22 by the operation on the display screen 21 (S12). Here, the operation to enlarge the display of the first button image 22 is, for example, a pinch out operation. FIG. 7 schematically illustrates an enlarged display of the first button image 22. In FIG. 7, the enlargement ratio of the display of the first button image 22 is less than the predetermined value. With reference to FIGS. 5 and 7, for example, by the pinch out operation of the button image 22*f* indicating the content of the character image 23*f* "Reboot," the button image 22*f* is enlarged to be displayed. The character image 41*f* "Start" displayed in the first region 25 of the button image 22*f* is also enlarged to be displayed.

Next, the determining unit 123 determines whether or not the enlargement ratio of the display of the first button image 22 is equal to or more than the predetermined value (S13). The predetermined value is, for example, 120%. When the enlargement ratio of the first button image 22 is determined to be equal to or more than the predetermined value (YES in S13), the second button image 28 and the second character image 27 are displayed in the first region 25 enlarged to be displayed (S14).

Figure 8:
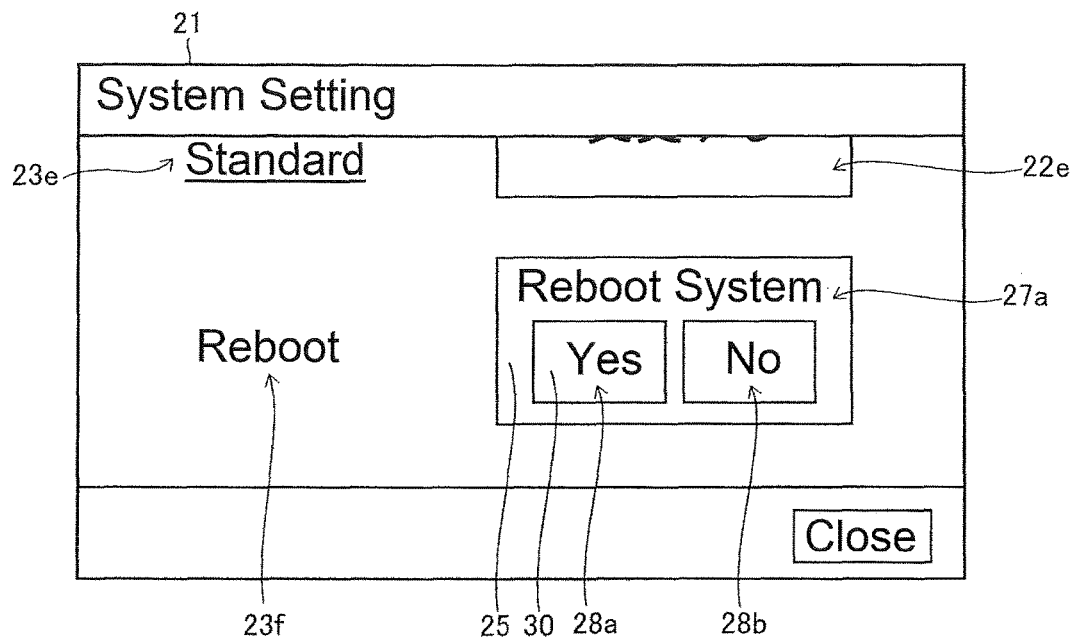
FIG. 8 schematically illustrates the second button image and the second character image displayed in a first region.

FIG. 8 schematically illustrates the second button image 28 and the second character image 27 displayed in the first region 25. In FIG. 8, the enlargement ratio of the display of the first button image 22 is equal to or more than the predetermined value. With reference to FIG. 8, the character image 27*a* as the second character image 27 on the setting input screen 26 of "Reboot," and the button images 28*a* and 28*b* as the second button image 28 are displayed in the first region 25 of the button image 22*f*. The character image 27*a* and the button images 28*a* and 28*b* are located on an inner side of the first region 25. The button images 28*a* and 28*b* detect the touch on the second region 30 by the user to accept the input of "Reboot."

Here, with such a multi-functional peripheral 11, the user can confirm the content of the predetermined setting and input the predetermined setting on the identical screen without transferring to the setting input screen 26 that causes the user to input the predetermined setting. The user can enlarge the display of the first button image 22 to confirm the content of the predetermined setting, thus easily knowing the content of the predetermined setting. Therefore, operation loads of the user can be reduced and convenience for the user can be improved.

In S13, when the enlargement ratio of the display of the first button image 22 is smaller than the predetermined value (NO in S13), only the first button image 22 is displayed. With reference to FIG. 7, when the enlargement ratio of the display of the button image 22*f* is smaller than the predetermined value, only the button image 22*f* is displayed. Even in such a case, when the user touches the inner side of the first region 25 of the first button image 22, the setting input screen 26 is displayed on the next screen. With reference to FIGS. 6 and 7, when the user touches the inner side of the first region 25 of the button image 22*f* for "Reboot," the setting input screen 26 of "Reboot" illustrated in FIG. 6 is displayed.

In S14, the second character image 27 and the second button image 28 may be configured to have display densities controlled corresponding to the enlargement ratio of the display of the first button image 22. For example, while detecting the request for the enlargement of the display of the first button image 22 and when the enlargement ratio of the display of the first button image 22 is equal to or more than the predetermined value, the first character image 41, the second character image 27, and the second button image 28 may be displayed such that the second character image 27 and the second button image 28 are displayed having the display densities lower than the display density of the first character image 41. While detecting the request for the enlargement of the display of the first button image 22 means, for example, while the user performs the operation to enlarge the display of the first button image 22.

Figure 9:
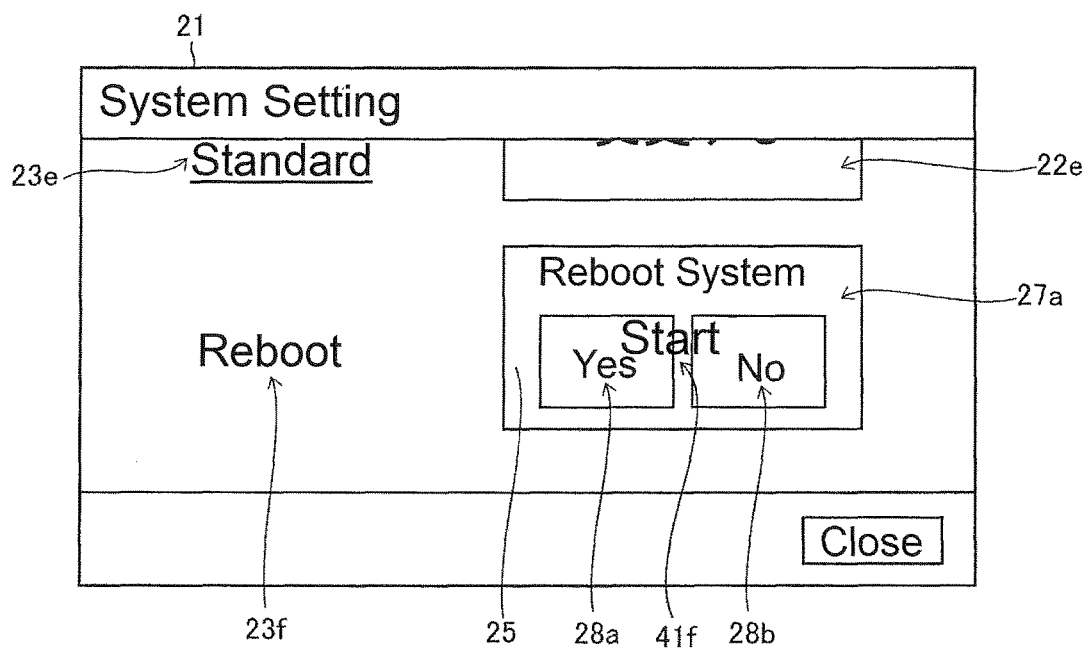
FIG. 9 schematically illustrates the first character image, the second character image, and the second button image displayed in the first region.

FIG. 9 schematically illustrates the first character image 41, the second character image 27, and the second button image 28 displayed in the first region 25. With reference to FIG. 9, the character image 41*f* "Start" that indicates the content of the button image 22*f* of "Reboot," the character image 27*a* that indicates the content of "Reboot," and the button images 28*a* and 28*b* that accept the input of "Reboot" are displayed together. When the operation to enlarge the display of the first button image 22 terminates, only the second button image 28 and the second character image 27 may be displayed by increasing the display densities of the second button image 28 and the second character image 27 and deleting the display of the first character image 41. With reference to FIG. 9, the display densities of the character image 27*a* that indicates the content of "Reboot" and the button images 28*a* and 28*b* that accept the input of "Reboot" are increased, and the display of the character image 41*f* "Start" is deleted. As a result, only the character image 27*a* and the button images 28*a* and 28*b* are displayed.

While the display apparatus 13 is configured to be controlled by the control unit 12 of the multi-functional peripheral 11, the display apparatus 13 is not limited to this and may include a control unit to control the display apparatus 13.

The display apparatus according to the disclosure is effectively used especially when the reduction of the operation load of the user and the improvement of the convenience for the user are required.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A display apparatus comprising:
   a display that has a touch panel function;
   a first display controller that performs a control such that a first button image and a first character image are displayed on the display, the first button image having a first region enclosed by a first line, the first button image detecting a touch within the first region to be transferred to a setting input screen for receiving a predetermined setting, the first character image being arranged in the first region, the first character image indicating a content of the first button image;
   a detection unit that detects a request for an enlargement of a display of the first button image by an operation on the display;
   a determining unit that determines whether an enlargement ratio is equal to or more than a predetermined value when the request for the enlargement of the display of the first button image is detected by the detection unit; and
   a second display controller that performs a control such that a second button image and a second character image are displayed on the display when the determining unit determines that the enlargement ratio is equal to or more than a predetermined value, the second button image being located on an inner side of the first region enlarged with the enlargement ratio, the second button image having a second region enclosed by a second line, the second button image detecting a touch within the second region to accept the input of the predetermined setting on the setting input screen, the second character image indicating a content of the predetermined setting in the first region.

2. The display apparatus according to claim 1, wherein the second display controller controls display densities of the second button image and the second character image corresponding to the enlargement ratio of the display of the first button image.

3. The display apparatus according to claim 1, wherein the second display controller displays the first character image, the second button image, and the second character image such that the second button image and the second character image have display densities lower than a display density of the first character image while detecting the request for the enlargement of the display of the first button image and when the enlargement ratio of the display of the first button image is equal to or more than the predetermined value.

4. The display apparatus according to claim 1, wherein the detection unit detects a pinch out operation to detect the request for the enlargement of the display of the first button image.

5. An image forming apparatus comprising:
a display apparatus that displays information; and
an image forming unit that forms an image based on the information,
wherein the display apparatus includes:
  a display that has a touch panel function;
  a first display controller that performs a control such that a first button image and a first character image are displayed on the display, the first button image having a first region enclosed by a first line, the first button image detecting a touch within the first region to be transferred to a setting input screen for receiving a predetermined setting, the first character image being arranged in the first region, the first character image indicating a content of the first button image;
  a detection unit that detects a request for an enlargement of a display of the first button image by an operation on the display;
  a determining unit that determines whether an enlargement ratio is equal to or more than a predetermined value when the request for the enlargement of the display of the first button image is detected by the detection unit; and
  a second display controller that performs a control such that a second button image and a second character image are displayed on the display when the determining unit determines that the enlargement ratio is equal to or more than a predetermined value, the second button image being located on an inner side of the first region enlarged with the enlargement ratio, the second button image having a second region enclosed by a second line, the second button image detecting a touch within the second region to accept the input of the predetermined setting on the setting input screen, the second character image indicating a content of the predetermined setting in the first region.

* * * * *